US008032557B1

(12) United States Patent
Vijendra et al.

(10) Patent No.: US 8,032,557 B1
(45) Date of Patent: Oct. 4, 2011

(54) MODEL DRIVEN COMPLIANCE MANAGEMENT SYSTEM AND METHOD

(75) Inventors: Sudhir Vijendra, White Plains, NY (US); Patricia G. S. Florissi, Briarcliff Manor, NY (US)

(73) Assignee: EMC Corporation, Hopkinton, MA (US)

( * ) Notice: Subject to any disclaimer, the term of this patent is extended or adjusted under 35 U.S.C. 154(b) by 425 days.

(21) Appl. No.: 12/057,675

(22) Filed: Mar. 28, 2008

(51) Int. Cl.
*G06F 17/30* (2006.01)
(52) U.S. Cl. ........ 707/783; 707/802; 707/803; 707/809; 713/200; 714/4; 714/47; 714/48
(58) Field of Classification Search .................. 707/802, 707/803, E17.044, 999.1, 999.101, 999.102, 707/783, 809, 999.009; 713/200; 714/4, 714/47, 48
See application file for complete search history.

(56) References Cited

U.S. PATENT DOCUMENTS

| | | | | |
|---|---|---|---|---|
| 7,430,452 | B2 * | 9/2008 | Cromer et al. ................... | 700/79 |
| 2003/0097588 | A1 * | 5/2003 | Fischman et al. .............. | 713/200 |
| 2004/0034659 | A1 * | 2/2004 | Steger ........................ | 707/104.1 |
| 2005/0021742 | A1 * | 1/2005 | Yemini et al. .................. | 709/224 |
| 2007/0067263 | A1 * | 3/2007 | Husain et al. ..................... | 707/2 |
| 2007/0156783 | A1 * | 7/2007 | Zbogar-Smith et al. ...... | 707/203 |
| 2007/0261121 | A1 * | 11/2007 | Jacobson ........................ | 726/26 |
| 2008/0114792 | A1 * | 5/2008 | LaMonica ..................... | 707/100 |

* cited by examiner

*Primary Examiner* — Shahid Alam
*Assistant Examiner* — Andalib Lodhi
(74) *Attorney, Agent, or Firm* — Krishnendu Gupta; Joseph D'Angelo

(57) ABSTRACT

A compliance lifecycle management system is provided that addresses policy management issues at each stage of policy maturity throughout a policy lifetime. The compliance lifecycle management system provides functionality for policy control at initialization by enabling specification and creation of policies including identifying redundant and sub/super sets of policies across domains. As an infrastructure and its associated policies mature and change, the compliance lifecycle management system monitors compliance to dynamic policies to check for policy conflicts. The compliance management process may further be used to simulate the introduction of policies into the infrastructure to view the resultant impact that a new or updated policies may have on a network. With such an arrangement, policy management practices become more responsive, predictable and efficient.

18 Claims, 7 Drawing Sheets

600

```
Interface PowerHeatPolicy:ECIM_Policy
{
    constraint AllowedPowerConsumption
        = PowerConsumption <= 750;
    constraint AllowedHeatDissipation
        = HeatDissipation <= 4000;
    risk BusinessCost;
    policyAction sendToWorkflowInterface;
    attribute string constraintType = "Regulation";
    attribute string lifecycleBehavior = "Discovery";
    relationship AppliedTo UnitaryComputerSystem;
    propagate attribute int sum BusinessCost
        = UnitaryComputerSystem, AppliedTo;
    propagate attribute int PowerConsumption        602
        = UnitaryComputerSystem, AppliedTo;
    propagate attribute int HeatDissipation
        = UnitaryComputerSystem, AppliedTo;
    readonly void sendToWorkFlowInterface();    Policy Class
}
```

```
Interface PowerHeatPolicyScope : ECIM_PolicyScope
{                                                604
    applyPolicy PowerHeatPolicy=
((UnitaryComputerSystem->Location) in Cities);
    attribute set Cities = {"San Jose, CA", "Milpitas, CA"};

PolicyScope Class
}
```

Policy Model

FIG. 6

MODEL DRIVEN COMPLIANCE MANAGEMENT SYSTEM AND METHOD

FIELD OF THE INVENTION

This invention relates generally to the field of policy management and more particularly to a model-based, model-driven compliance maturity and lifecycle management system.

BACKGROUND OF THE INVENTION

A network is comprised of hardware, software and media connecting information technology (IT) resources. Organizations design, deploy and administer networks according to various rules or policies provided by a variety of administrative sources. For example, regulatory and industry requirements such as Sarbanes-Oxley (SOX), Health Insurance Portability and Accountability Act (HIPAA) and Payment Card Industry (PCI) require companies to manage their IT in specific ways. Governance initiatives, such as COBIT and IT Infrastructure Library (ITIL) provide best practices frameworks that recommend the extensive use of polices to define how companies operate as well as how the policies can be enforced. In addition, each organization applies additional policies to their resources according to their own particular business needs. Managing compliance involves implementing a common set of IT controls which meet both external and internal requirements.

Policing compliance involves identifying the policies that are associated with resources and monitoring the resources for compliance with the policies. Monitoring for compliance is complicated because policies are often sourced by different administrative entities which define their policies using their own semantics and syntax. As a result, it is often difficult to quickly discern inter-policy relationships, dependencies and conflicts. In addition, policies are not static, but rather evolve over time as new resources, applications and content is introduced into the network. A modification to an existing policy may disrupt the ability of the network to deliver resources according other existing policies. The complexity of policy application quickly overwhelms the practical application of the policies.

It would be desirable to identify a system and process which would enable the coherent, consistent application of multiple policies across a network through identification, monitoring and resolution of inter-policy relationships and dependencies.

SUMMARY OF THE INVENTION

A compliance lifecycle management system is provided that addresses policy management issues at each stage of policy maturity throughout a policy lifetime. The compliance lifecycle management system provides functionality for policy control at initialization by enabling specification and creation of policies including identifying redundant and sub/super sets of policies across domains. As an infrastructure and its associated policies mature and change, the compliance lifecycle management system monitors compliance to dynamic policies to check for policy conflicts. The compliance management process may further be used to simulate the introduction of policies into the infrastructure to view the resultant impact that a new or updated policies may have on a network. With such an arrangement, policy management practices become more responsive, predictable and efficient.

According to one aspect of the invention, a method for managing policy compliance across an infrastructure includes the step of maintaining a policy-aware configuration management database comprising a topology of policy-aware objects. The topology defines structural and behavioral relationships of the objects and spans multiple domains. Information is exchanged between objects in different domains by propagation through the topology. Policies are managed across the infrastructure at a plurality of stages of policy and infrastructure maturity using the topology of policy-aware objects. The stages of policy and infrastructure maturity are associated with changes in state of at least one of the infrastructure, policies of the infrastructure and compliance of the infrastructure.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated by the claims.

BRIEF DESCRIPTION OF THE FIGURES

FIG. 6 is a diagram illustrating exemplary policy and policy scope models;

Figure 1:
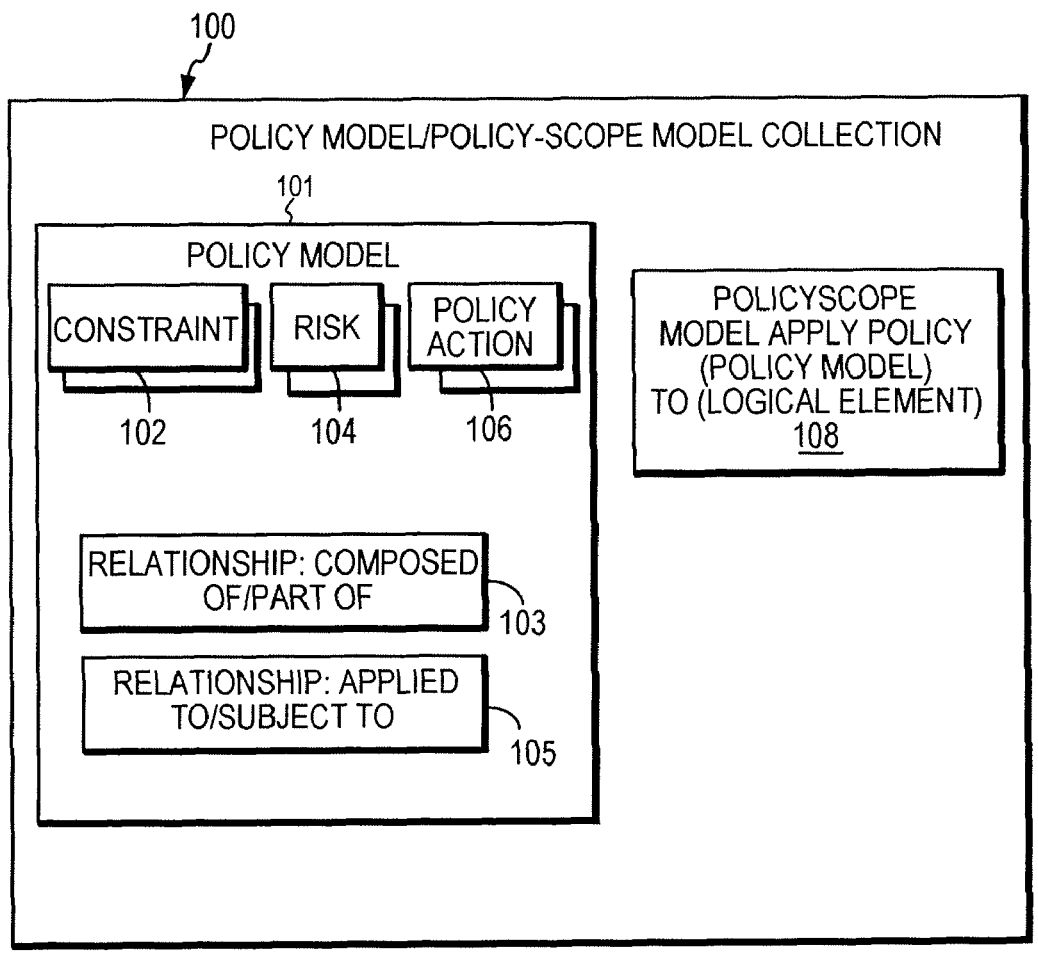
FIG. 1 is a block diagram illustrating exemplary elements of a policy model and policy-scope model of the present invention.

It is to be understood that these drawings are provided solely for the purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possible supplemented with reference characters where appropriate, have been used to identify similar elements.

DETAILED DESCRIPTION

According to one aspect of the invention, a Compliance Lifecycle Management System (CLMS) automates planning, administration and enforcement of policies at each stage of policy maturity, including automated remediation of policies in the event of non-compliance. The CMLS incorporates a model-based, model-driven approach to manage information technology (IT) policies across domains.

For the purpose of this application, policies include documented management expectations and intentions. Policies are used to direct decisions, and to ensure consistent and appropriate development and implementation of processes, standards, best practices, roles, activities, IT infrastructure, etc. Compliance is a means by which organizations address organizational, regulatory and government constraints. The Compliance Lifecycle Management System (CMLS) provides a system for managing compliance of policies across domains during policy maturity.

An example of IT policies that may be modeled and controlled according the present invention include, but are not limited to, infrastructure policies, information policies, Information Lifecycle Management (ILM) policies and security policies. Infrastructure policies relate to the performance of services delivered by the information infrastructure such as Quality of Service (QoS) policies, Service Level Agreement (SLA) policies and redundancy requirement policies. Information policies relate to industry regulation aspects such as content management policies and process management policies. ILM policies relate to the management of events that affect the lifecycle of the information, such as deletion, replication and recovery. Security policies relate to ensuring that data can only be accessed by authorized managed objects, for example authentication, authorization and accounting (AAA) policies, key access policies, etc.

According to one aspect of the invention, the CLMS uses policy models and policy-scope models to represent policies and their associations to resources or groups of resources. Policy models describe the properties of policies such as the constraints, risks of non-compliance and the behavioral relationships between policies. Policy-scope models associate policies with resources. De-coupling of the policy model and policy-scope model in this manner allows policy re-use across different IT domains by associating different policy-scope models with the same policy model.

According to one embodiment, policy models and policy-scope models comprise extensions of known models, written in a common language for describing a structure having classes, attributes, instances and relationships, and adapted for policy domain management. The language may be textual, such as the Managed Object Definition Language (MODEL) available from EMCC® System Management ARTS (SMARTS), of White Plains, N.Y., DMTF Common Information Model (CIM), or the Unified Model Language (UML), although the invention is not limited to the use of any particular language for modeling components or entities.

The policy-scope models associate policies with one or more resources of an infrastructure. Resources (referred to herein as Managed Elements) are represented using structural models that detail the attributes and relationships between resources and causality models which describe the behavior of entities and how events, symptoms and problems propagate between the resources. The causality model thus relates behaviors in an abstract and general way by identifying dependences between problems (causing events at the nodes of a topology) and the symptoms (detectable events in the topology). At run time, the structural and causality models are use to build a topology of objects which are structurally and behaviorally related.

Examples of model based system representation using the CIMs model for generating structural and causal models is discussed in the following commonly owned applications, each of which is incorporated by reference: U.S. Patent Application Number 20050021742, entitled "Method and Apparatus for Multi-Realm System Modeling", U.S. Patent Application number 20050210132, entitled "Method and apparatus for determining causality mapping of distributed systems", incorporated herein by reference, U.S. application Ser. No. 11/394,701 entitled "Architecture for Using a Model-Based Approach for Managing Resources in a Networked Environment," application Ser. No. 11/395,420 entitled "Method and Apparatus for Software and Resource Management with a Model-Based Architecture", and application Ser. No. 11/726,326 entitle "Method and Apparatus for Horizontal and Vertical Modeled Representations and Analysis of Distributed Systems."

Policy and policy-scope models are generic models written in a universal language separate from the underlying topology of the network, enabling policy models to be scaled and used across domains to automate application of well-formulated policies. Policy models and policy-scope models are declared as classes from which many policy objects and policy-scope objects are instantiated and associated with topology objects at run time. With such an arrangement, compliance management practices become more responsive, practicable and efficient.

Referring now to FIG. 1, a block diagram illustrating elements of a policy and policy-scope model is provided. The Policy model 101 is comprised of relationships and keywords. A relationships map policy model instantiations to other policy model instantiations. The relationships of the policy model include a composed of/part of relationship 103 and an applied to/subjected to relationship 105. The composed of/part of relationship 103 is used to relate policy models by specifying policy containments. The composed of/part of relationships may be used to define hierarchical relationships between policies and may be used for aggregating risk and other attribute data. For example, a first policy model may identify a security policy that is to be applied, and a second policy model which is defined to be part of the first policy model may more particularly point out the key policy that comprises the security policy.

The applied to/subjected to relationship 105 is defined by a policy engine during run time in response to a policy model instantiation. As will be described in more detail with regard to FIG. 2, the applied to/subject to relationship maps the constraints, risks and actions of the policy model to one or more managed objects. For example, a service level agreement policy may be associated with a communication service which is delivered by one or more configured items of the IT infrastructure.

The policy model keywords specify one or more constraints 102, risks 104 and policy actions 106. The constraints 102 specify one or more policy constraints, such as thresholds for certain variables associated with the policy. The risk keyword identifies the particular attributes of managed objects which are aggregated by the policy. The aggregated risk is one factor in determining compliance of the policy. In one embodiment, each parent policy in a hierarchy aggregates the risks of all children policies. The policy actions specify one or more actions to be taken in the event that non-compliance with the policy is detected, including identifying the appropriate destination for notifications when non-compliance is detected.

As mentioned above, the policies are applied to managed objects through the application of policy scope models; that is the policy scope model ties a policy model and its associated risks, constraints and actions to one or more managed elements. The policy models and policy-scope models are written using a declarative approach that only exposes the invariants of the policy (such as constraints and remediation) to the administrative entity. The particular method used to implement the policy may be decided by the particular administrative entity that authors the policy. In doing so, the models may be used by a federated compliance management system that defines and organizes policies and enables re-use and optimization of policies across domains, and allows customization of policies within domains.

FIG. 1 thus illustrates the data structures of various models that may be stored as part of a collection of models 100. During run time, a policy engine effectively builds policy objects and associates the policy objects with models of managed elements.

Figure 2:
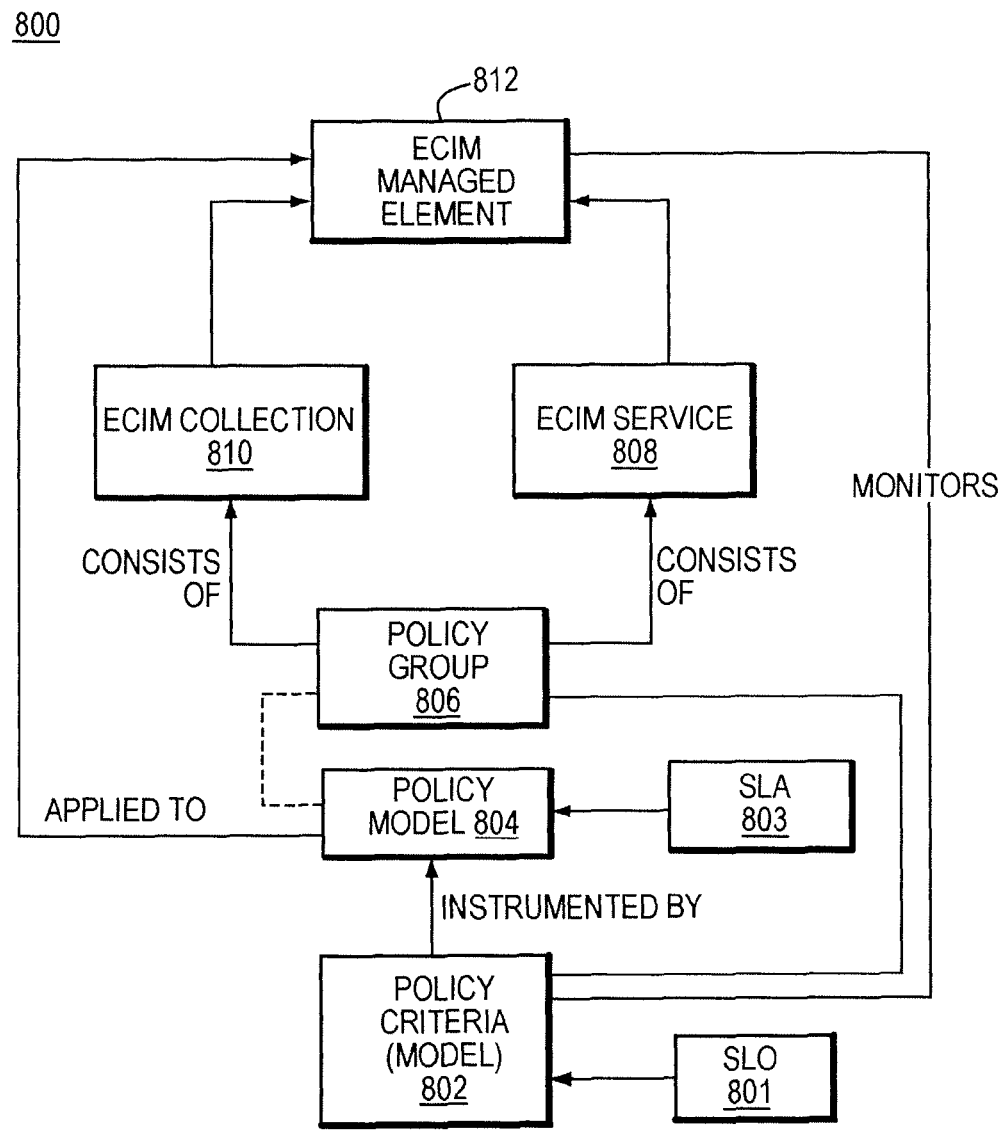
FIG. 2 is a block diagram illustrating the instantiation of policy objects using the policy/policy-scope models of the FIG. 1.

FIG. 2 is a block diagram provided to discuss the use of policy-aware objects and compliance. A policy criteria (rule) 802 may be defined in accordance with a Service Level Objective (SLO). From the rule, a policy model 804 specifying constraints, risks and actions is specified. The policy model may also be subject to other constraint, such as a Service Level Agreement (SLA) 803. A policy scope model is specified to relate the policy model 804 to one or more infrastructure resources 810 and services 812. At run time, the managed object 812 is instantiated, and the policy engine monitors the managed element in accordance with the rule 802 to ensure compliance with the SLO.

Figure 3:
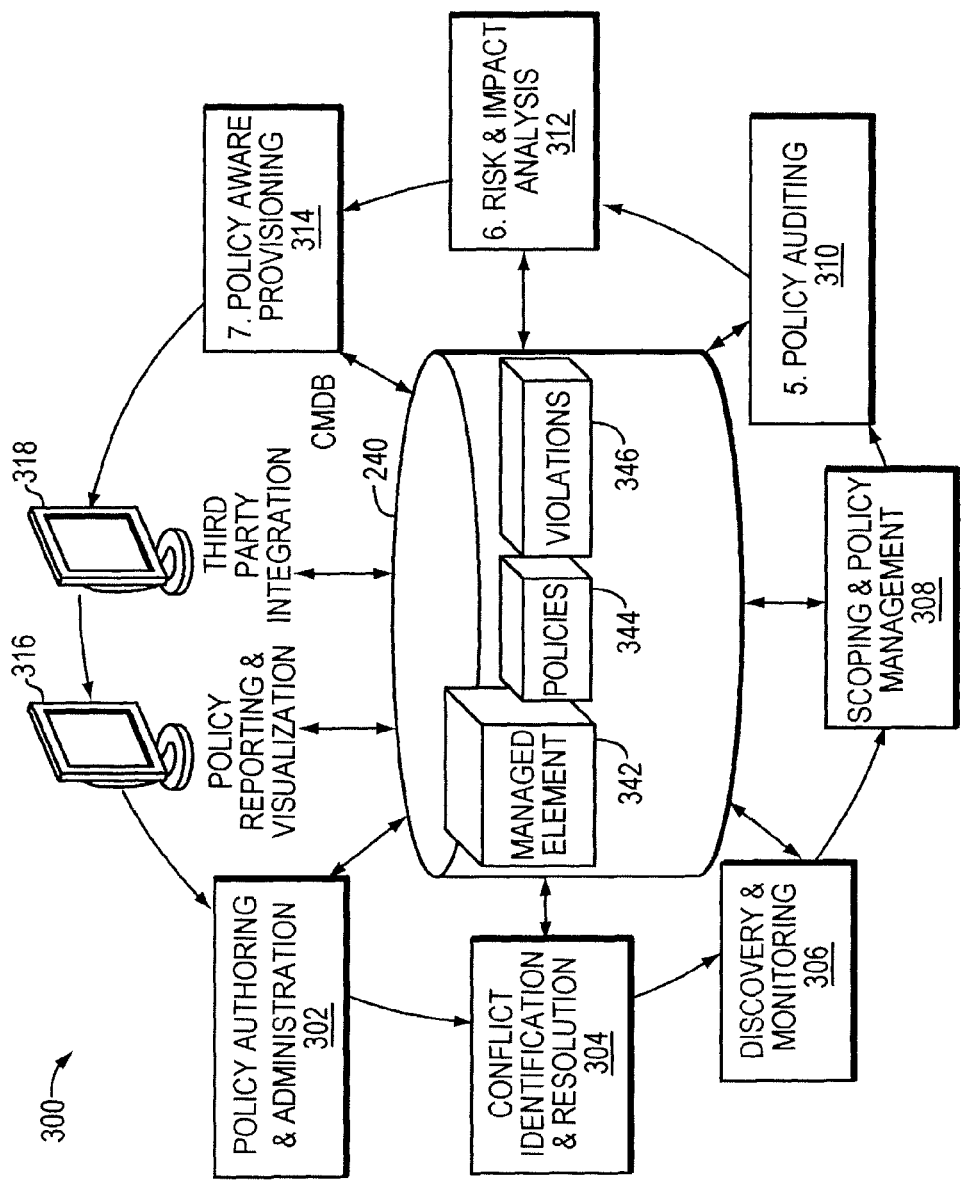
FIG. 3 illustrates components of a model-based, model-driven compliance lifecycle management system of the present invention for managing policies through all stages of a policy maturity lifecycle.

Referring now to FIG. 3, FIG. 3 illustrates components of a model-based, model-driven compliance lifecycle management system of the present invention for managing policies through all stages of a policy maturity lifecycle. The compliance lifecycle management system may be used to manage policies in a variety of business environments, including those arranged as a Service Oriented Architecture (SOA). A SOA is an architectural style that guides aspects of creating and using business processes, packaged as services, throughout their lifecycle. The SOA defines and provisions the IT infrastructure and allows different applications to exchange data and participate in business processes.

Any of the components of an IT infrastructure may be said to have a lifecycle. The lifecycle comprises the defined stages in the life of an IT service or other resource, including aspects such as managed object, incident, problem, change. The lifecycle defines the categories for status and the status transitions that are permitted for the service or other resource. For example, the lifecycle of an application includes stages such as requirements, design, build, deploy, operate and optimize. The expanded incident lifecycle includes actions such as detect, respond, diagnose, repair, recover, and restore. The lifecycle of a device may include status such as ordered, received, in test, live, disposed, etc. Information also has an associated lifecycle. Information Lifecycle Management (ILM) comprises the policies, processes and practices and tools used to align the business value of information with the most appropriate and cost-effective IT infrastructure from the time information is conceived through its final disposition. Information is aligned with business processes through management policies and service levels associated with applications, metadata, information and data.

According to one aspect of the invention it is appreciated that policies also have a lifecycle. The lifecycle of a policy has various stages of maturity, from initial authoring and administration through implementation through maintenance of the policy and further through remediation in the face of policy non-compliance. Because policies are applied to managed elements that may have their own particular lifecycle, the administration and interaction of policies evolves as managed elements and policies are added and removed from the environment.

The CMLS of the present invention supports all aspects of policy management at each stage of maturity of the policy through the policies' lifetime, using the above described policy models.

In FIG. 3 one embodiment of a CMLS system 300 is shown to include a plurality of compliance maturity stage program modules 302-314. Each of the compliance maturity stage program modules comprises program code which is stored in a computer readable storage medium and is operable when executed upon by a processing device (not shown) to perform one or more defined tasks. Exemplary tasks include but are not limited to policy authoring and administration 302, conflict identification and resolution 304, policy discovery and monitoring 306, policy scoping and management 308, policy auditing 310, risk and impact analysis 312 and policy aware provisioning 314. In addition, a policy reporting and visualization interface 316 and a third party integration tool 318 may be included as part of the CMLS system. The interface 316 may be used to view performance and non-compliance reports as well policy/infrastructure relationships for network management and other purposes. The third party integration tools may be used to integrate third party policy models into the CMLS system. Each of the modules and tools communicates with models and objects that are stored in a configuration management database (CMDB) 240.

The Configuration Management Database (CMDB) is a database that contains all relevant information about the components of the information system used in an organization's IT services and the relationships between those components. A CMDB provides an organized view of data and a means of examining that data from any desired perspective. Within this context, components of an information system are referred to as Managed Elements (MEs). An ME can be any conceivable IT component, including software, hardware, documentation, and personnel, as well as any combination of them. The processes of configuration management seeks to specify, control, and track managed elements and any changes made to them in a comprehensive and systematic fashion.

According to one aspect of the invention, the CMDB also stores the policy/policy-scope models and policy objects. During run-time the managed element and policy models are used to construct a topology of the SOA infrastructure which comprises managed objects having associated policy objects. The topology reflects the structural and behavior associations of objects and their policies.

In a preferred embodiment, the extension of a managed object to include one or more associations with policy objects results in a new ICIM model, which is referred to herein as an EMC CIM (ECIM) model. Managed elements that are instantiated using ECIM models are referred to as ECIM objects. Augmenting managed object information with policy object information integrates the processes of configuration management with policy management. The CMDB, in addition to being configuration aware, becomes a policy-aware CMDB which may be used to represent and analyze the infrastructure from a variety of perspectives and is further capable of categorizing the policies according to customer requirements, maintaining the historical policy definitions and appropriately aggregating risk through the use of existing infrastructure relationships provided by the ECIM models.

Several of the compliance tools of the CMLS system will now be described in further detail.

Policy Visualization Tools

In a customer environment, policies and the managed objects they apply to both expand continually. Effective policy management requires flexibility in policy creation, organization, and scoping of target objects.

Figure 4:
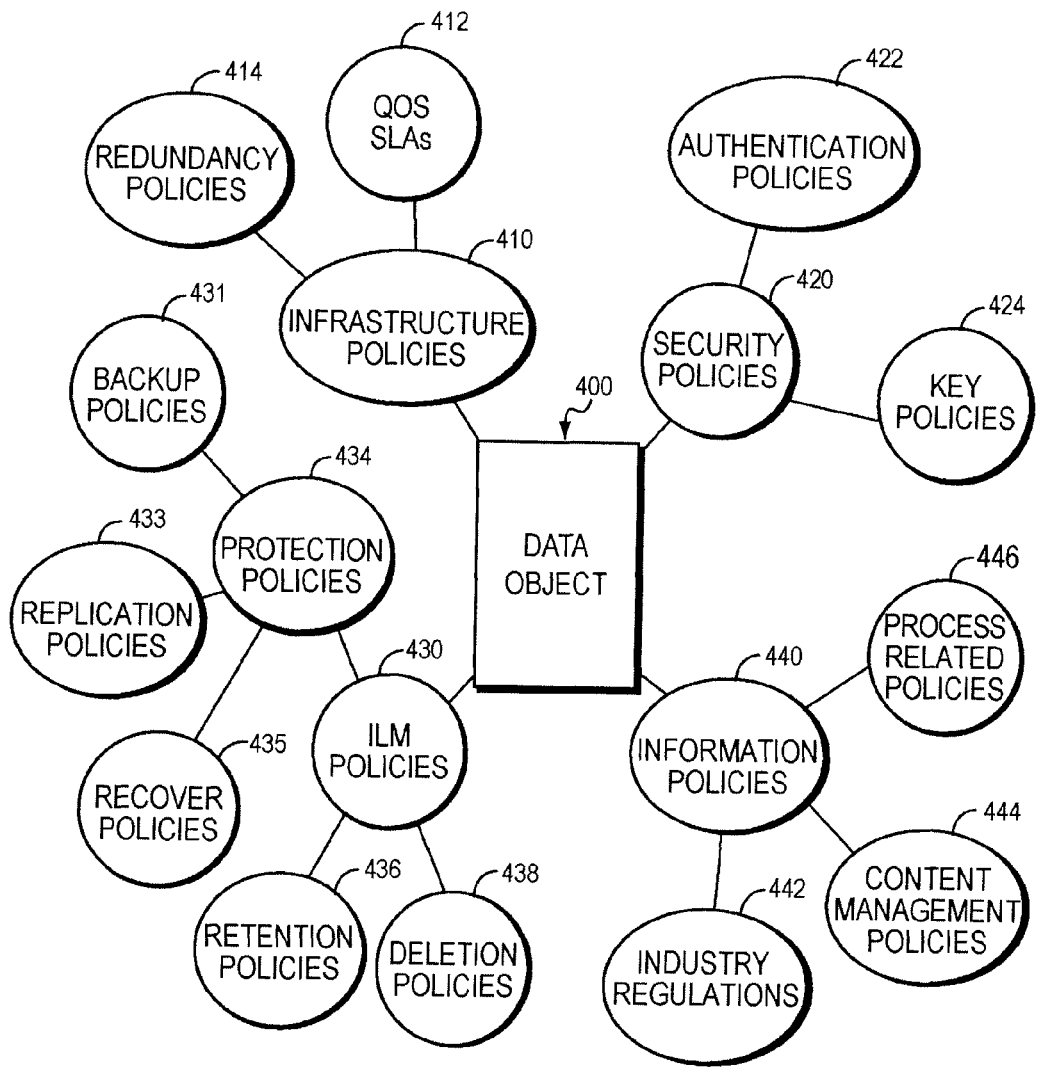
FIG. 4 is a diagram illustrating policy/policy-scope object relationships from an object-centric perspective.

The CMLS provides a policy reporting and visualization tool 316 which enables policies associated with a topology of ECIM objects to be viewed from a variety of perspectives. For example, an object-centric perspective enables administrators to determine which policies relate to each topological object, and a policy-centric perspective may be used to determine which objects are governed by each policy FIG. 4 is a screen shot that illustrates policies viewed from an object-centric perspective. The object-centric perspective illustrates the organization of policies from four different administrative policy domains (Infrastructure 410, Security 420, Information 430 and ILM 440) that pertain to an object within an enterprise. The object-centric perspective may be generated by identifying all policies that are applied to a given managed object, and graphically illustrating the composed of/part of relationships between the policies. The object-centric perspective may allow an administrator to quickly view when conflicting and/or redundant policies are applied to a data object. In addition, the object-centric perspective easily illustrates holes in the policy for the given data object.

Figure 5:
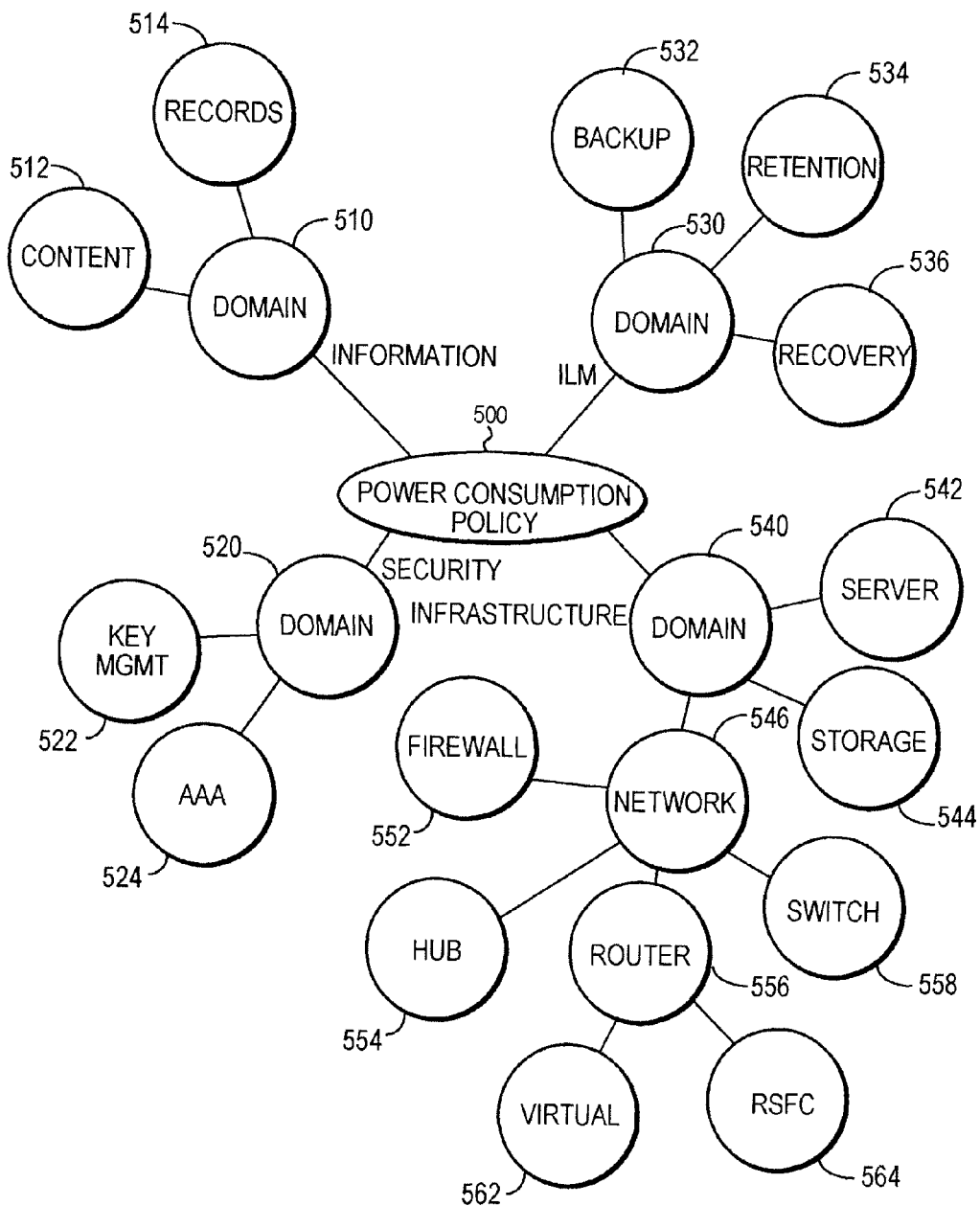
FIG. 5 is a diagram illustrating a policy/policy-scope relationships from a policy-centric perspective.

FIG. 5 illustrates a policy-centric perspective visualization. An administrator may use the policy-centric view to visualize the application of the policies across the system. In FIG. 5, the system is apportioned into Service domains including an Information Service domain 510, an ILM service domain 530, a Security domain 550 and an Infrastructure domain 540. The policy-centric domains may be used to monitor the consistency of policy application across the system. A policy-centric graph such as FIG. 5, identifies all policy models having the same policy class (i.e., Power Consumption policy), but different policy scopes, and graphically representing the relationships of associated ECIM MEs.

Policy Authoring and Administration

The visualization and reporting tools 316 may be used during policy authoring and administration. The policy authoring and administration tools 302 provides support for policy model creation, and the assignment of policies to elements within the IT environment as modeled by the ECIM collection in the CMDB. According to one aspect of the invention, formal specification of policies is performed using UML or the MODEL language to create classes, specify attributes and other properties, and define relationships between policies and managed objects. A user interface associated with the authoring and administration module 302 permits entry of customized policies, or allows a network administrator to select from a list of a plurality of pre-defined policies. In addition, the CMLS can be configured to import policies from third-party compliance products from different domains. Policy model authoring is a two step process that involves authoring of a policy model (or selection of a policy model from a pre-existing list), authoring of Policy Scope model.

An illustrative example of an authored policy 600 is shown below in FIG. 6 to include a Policy model specification 602 and a Policy-Scope model specification 604. In the example of FIG. 6, the policy is a Power Heat Policy which sets constraint thresholds for power consumption and heat dissipation to 750 and 4000, respectively. The risk keyword identifies that the BusinessCost attribute of the managed object is used to gauge risk. The policy action taken in response to non-compliance is to forward attributes to a Workflow interface.

The value of a propagated attribute can be obtained from a single object, through a relationship or it can be retrieved from multiple objects through a relationship set. In the example of FIG. 6, the 'propagate' function defines how the attributes from the managed object aggregate with the risks and constraints of the policy. In this example, the business costs, power consumption and heat dissipation attributes of the managed object are aggregated by the policy, and are used to monitor policy constraints.

The PolicyScope model 604 specifies the logical names of models of managed elements or managed element groups to which the Power Heat Policy applies. In this example, the policy is applied to computer systems in San Jose and Milpitas.

Existing user interface tools allow an IT infrastructure to be viewed in a graphical manner, illustrating IT MOs and their connectivity. Such tools generally allow the IT infrastructure to be viewed from a variety of perspectives, hierarchical levels and granularities. According to one aspect of the invention, it is envisioned that the policy authoring and administrative tools would work together with such infrastructure viewing tools to enable automatic generation of policy scope models through selection of ME objects, hierarchies, etc., and association of the policy models with the selected MEs. For example, a network administrator may select a policy model and using a mouse or other selection tool iteratively selects the elements of the IT infrastructure that would be affected by the policy. Policy Scope models would automatically be generated in such instances. Other methods of selecting managed elements and managed element groups to automate policy scope model generation (such as string matching, inference and the like) are also within the scope of the present invention.

Policy Conflict Identification and Resolution

As policies are defined and applied, conflicts may arise involving their scoping and ordering of precedence. The CMLS includes conflict-identification capabilities that ensure consistency of policy application through pre-deployment validation of policies. Conflict identification and resolution tools analyze policies for the verification of divergences and potential ways to solve detected inconsistencies.

For example intelligent creation of a "policies dependency graph" may identify potential inconsistencies that could lead to the inability of enforcing policies. In general, the policy dependency graph is a directed acyclic graph representing a dependency relation. The construction of dependency graphs are well known to those of skill in the art. In general, the intelligent dependency graphs used for conflict resolution uses the constraints of the policy classes and their children to identify conflicts and redundant policies.

Upon detection of a conflict between policies, or a redundancy of policies, the policy conflict and resolution tools identify and reports the conflicts to network administrators. The tools may also return proposed ways to solve conflicts. The conflict identification and resolution tools run automatically in response to a triggering event (such as change in policy or infrastructure maturity caused by modifications to policies or infrastructure changes), or may be used by the administrator to validate a policy prior to deployment of the policy in the infrastructure.

Discovery and Monitoring

The Discovery and Monitoring tools include tools that provide automated discovery of managed objects, automated topology creation, status monitoring, and root-cause analysis mechanisms. For example, the CMLS may use topology and status data discovered, instantiated, and analyzed by EMC Discovery Centre to correlate knowledge of the managed environment and provide the basis for policy decisions. Methods and systems for discovering various elements in an infrastructure are described in the following commonly owned patent applications, each of which is incorporated herein by reference: "Method and Apparatus for Discovering Distributed System Architecture", Ser. No. 11/165,986, filed Juen 24, 2005, "Model-Based Discovery of Multi-Protocol Label Switching Virtual Private Networks", Ser. No. 10/950,150, filed on Sep. 24, 2004, "Model Based Application Discovery", Ser. No. 11/054,578, filed Feb. 9, 2005, "Method and Apparatus for Model-Based Routing Protocol Discovery and Identification", Ser. No. 11/211,234, filed Aug. 25, 2005, "Method and System for Identifying and Classifying Network-Based Applications", Ser. No. 11/054,577.

CMLS can use performance data discovered by the EMC SMARTs IP Performance Manager to determine when policy-defined thresholds are exceeded, using methods described in the following commonly owned U.S. patent applications: application Ser. No. 11/077,933, filed Mar. 11, 2005 and entitled "Method and Apparatus for Monitoring Distributed Systems", application Ser. No. 11/006,472 entitled "Method and Apparatus for Adaptive Monitoring and Management of Distributed Systems", application Ser. No. 11/130,046 entitled "Method and Apparatus for Automated Content-Based Peer-to-Peer Thresholding" and application Ser. No. 11/130,042 entitled "Method and Apparatus for Automated Time-Based Peer-to-Peer Thresholding". In addition, the CMLS may use device availability data discovered by the EMC SMARTs IP Availability Manager to enforce redundancy policies.

Scoping and Policy Management

The CMLS system includes scoping and policy management tools which apply policies to the appropriate ME targets according to the policy scope classes. In particular, the scoping and policy management tools provide the run-time relationships between policy models and ECIM ME models as described in the above referenced commonly owned patent applications. The CMLS automatically associates policies to managed objects, whether they are physical or virtual. The scoping and policy management tools include tools for analyzing the target managed domain to identify candidate configured items for the application of policies.

Policy management involves the automatic propagation of attribute, event, symptom, problem and other status information during workflow execution to detect policy violations as specified in the compliance policy model and event propagation. Event and symptom information horizontally and vertically across domains. A causality matrix may be used to associate received events, symptoms and symptoms associated with policy violations with elements in the modeled infrastructure. The causality matrix can be used together cross-domain symptom and event information and with codebook technology to perform root cause and impact analysis as described in commonly owned U.S. Pat. Nos. 7,003,433, 6,868,367, 6,249,755, 5,661,668, and 5,528,516, incorporated herein by reference.

According to one aspect of the invention, the CMLS stores policy violation information in the CMDB. As will be discussed below, the policy violation information is therefore made available to policy auditing tools.

Policy Auditing

The CMLS system uniquely identifies policy violations for reporting to network administrators. Information associated with the policy violations are stored in the CMDB. According to one aspect of the invention policy auditing tools are provided which enable network administrators to audit the compliance of the system. Policy auditing takes into consideration characteristics of the scoped managed elements; thus managed elements in different geographic areas may have different thresholds for remediation. The tools monitor the policies and provide alerts regarding violations. The tool may provide for real-time, off-line, and/or on-demand auditing of policy. The ability to support many different mechanisms for monitoring and triggering policy verification accommodates different policies and different entities that impose different analytical requirements. CMLS may leverage the monitoring already made available by EMC IT product suites and third-party software. For example, policy auditing may involve the use of different codebooks for groups of managed elements in different policy scopes.

Impact Analysis and Risk Assessment

The CMLS system includes impact analysis and risk assessment tools. Risk and impact analysis tools calculate the aggregate risks and impact introduced by a policy violation, for example using the Root Cause and Impact Analysis and codebook technology provided by EMC SMARTS, Inc., incorporated by reference above. As policy are applied and audited, a network administrator may use CMLS's impact analysis tools to consider the prioritization of policy remediation based on business needs, automatically assessing risk factors against the impact of non-compliance. For example, the administrator may use these tools to perform contingency planning for business cost and risk factors and prioritization of alternatives to minimize penalty costs. The network administrator may use these tools to simulate modifications to policies and their associated impact prior to actual modification of the policies.

Policy-Aware Provisioning

The ECIM models may be used together with policy aware provisioning tools 314 to ensure that policy compliance is a factor in resource provisioning decisions. Policy-aware provisioning tools allow for design and validation of potential configuration scenarios to identify potential policy violations. Policy-aware provisioning tools support comprehensive modeling of provisioning behavior, providing for analysis of "what-if" scenarios, policy dependencies, and potential violations. The tools enable IT operations to simulate provisioning environments before violations occur, optimize provisioning cycles to ensure compliance and reduce provisioning time.

The CMLS system therefore includes a number of tools which may be used at various stages of policy maturity. The tools facilitate policy coordination, monitoring, maintenance and remediation in a multi-domain infrastructure, allowing policy considerations to be appropriately addressed at each step in an infrastructure lifecycle. Easing the definition and application of policies across management domains improves consistency, makes visible the policy structure and encourages policy reuse. Integrating the modeling of policies with the modeled IT environment allows improved compliance reasoning and proactive management, in the observed environment and as part of a scenario-driven planning activity.

Figure 7:
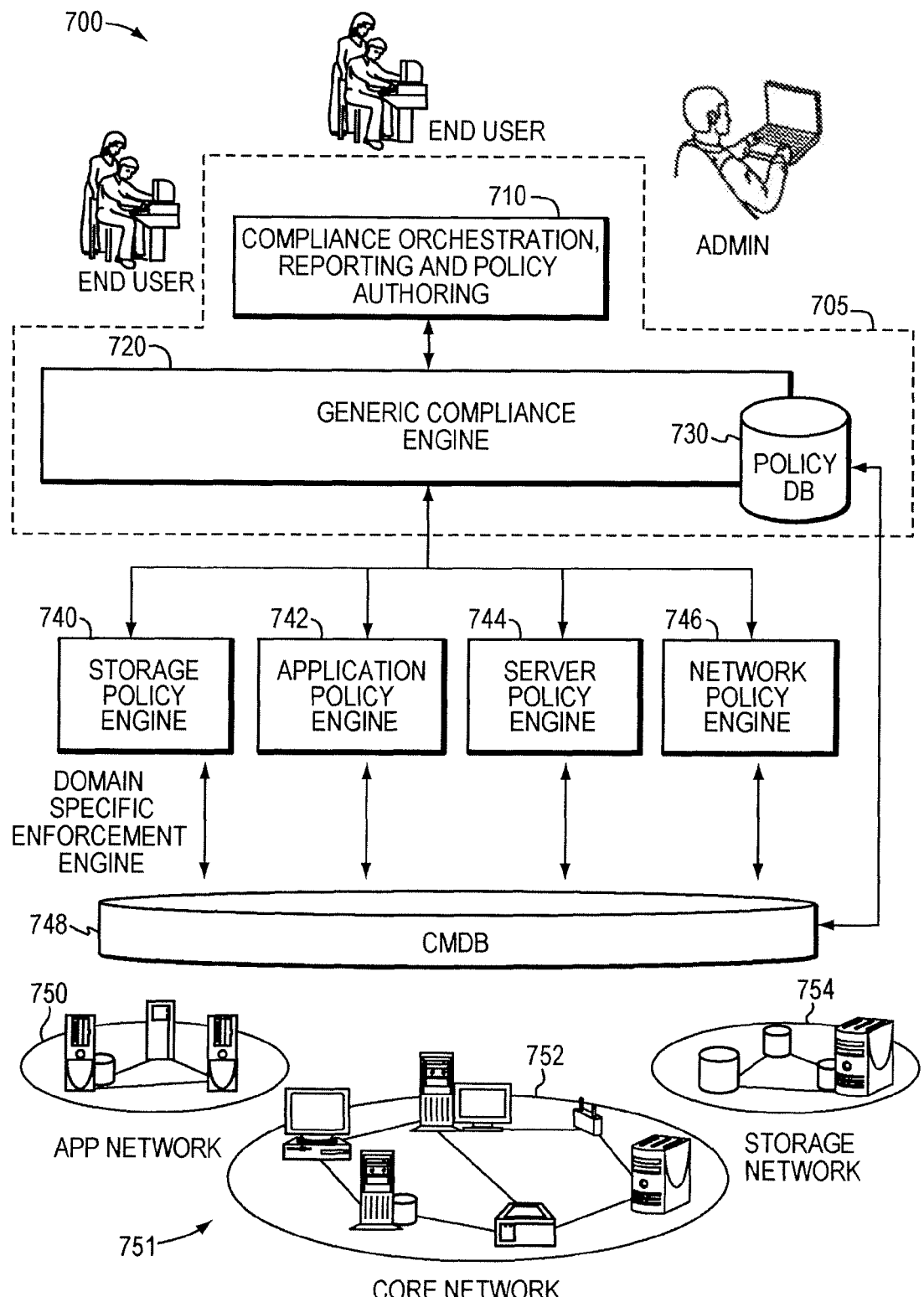
FIG. 7 is a block diagram of an IT infrastructure incorporagting the compliance lifecycle management system of the present invention.

Although the tools have been described as having separate features which are applicable at various stages of a policy compliance maturity lifecycle, it will be appreciated that the functionality provided by the tools may be combined in different manners according to the deployed compliance management solution. For example FIG. 7 illustrates an IT environment 700 that includes a Compliance lifecycle Management system 705 such as that described above.

Compliance orchestration, reporting and policy authoring tools 710 are made available to network administrators and end users via a user interface. The user interface may be a web-based or web-accessible interface, or may be a custom API provided as a downloadable client. A compliance administrator would use the policy model specifications and policy scope model specifications described with regard to FIGS. 1 and 2 to author and organize policies using schema stored in the generic Policy Database (DB) as a basis 730.

The administrator scopes and applies generic policies of the Policy DB 730 to target objects in the infrastructure. In particular, the administrator may author or policies for inclusion in the policy model database 730, or otherwise select policies directly from the DB 730. The administrator may apply a policy to any managed element. As each policy is administered, policies are associated with managed objects in the infrastructure topology and the ECIM objects are stored in the CMDB. Storage policy engine 740, application policy engine 742, server policy engine 744 and network policy engine 746 each respectively control the administration of policies within their domain. Although the infrastructure may comprise many different domains (such as application domain 750, network domain 752 and storage domain 754), the characteristics of ECIM objects in the topology enable propagation of attribute, event and other properties between the objects and across domain end-points according to a defined propagation behavior. As a result, the impact of the addition of a new policy or a new managed element in the existing policy-aware infrastructure may be readily discerned, and remediation The compliance engine 720 uses the tools described with regard to the compliance maturity lifecycle model of FIG. 3 to optimize policy management across the storage, application, server and network domain. Compliance Managers could import or export relevant policies, and enable and monitor them for provisioning and violations. As a result, federated policy organization and management across domains is provided.

Accordingly a compliance lifecycle management system has been shown and described which facilitates cross domain policy compliance for each stage of maturity of a policy and infrastructure. Policy models and policy-scope models are used to extend managed objects with policy awareness, thereby providing a policy-aware infrastructure and configuration management database having a capability of viewing system policy application at a variety of granularities and from a variety of perspectives. With such an arrangement, proactive policy conflict diagnosis and resolution may be achieved.

Having described various embodiments of the invention, it will be appreciated that many of the above figures describe methods, apparatus (systems), modules, tools and computer program products. It will be understood that each module, tool or computer program product can be implemented using computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions described.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A method managing policy compliance across an infrastructure includes the steps of:

maintaining a policy-aware configuration management database comprising a topology of policy-aware objects, the topology defining structural and behavioral relationships of the policy aware objects, wherein the policy aware objects are associated with models of managed elements, wherein the managed elements are IT components, wherein the topology spans multiple domains indicating the relationships between managed elements and wherein information is exchanged between the policy aware objects in different domains by propagation through the topology by leveraging the defined structural and behavioral relationships; wherein the configuration management database enables policy management in a infrastructure domain, a security domain, and an information domain; wherein at least one policy is applied to the information domain from a group of policies consisting of industry regulation aspects, content management policies and process management policies; wherein at least one policy is applied to the security domain of a group of policies consisting of ensuring that data can only be accessed by authorized managed objects, authentication, authorization and accounting (AAA) policies, and key access policies; wherein at least one policy is applied to the infrastructure domain of the group of policies consisting of performance of services delivered by the information infrastructure such as Quality of Service (QoS) policies, Service Level Agreement (SLA) policies and redundancy requirement policies;

managing policies across the infrastructure at a plurality of stages of policy and infrastructure maturity using the topology of policy-aware objects, wherein the plurality of stages of policy and infrastructure maturity are associated with changes in state of at least one of the infrastructure, policies of the infrastructure and compliance of the infrastructure.

2. The method of claim 1 wherein a policy-aware object is instantiated from a policy model which define at least one of the constraints, risks and actions of a policy, and a policy-scope model which identifies at least one managed element to which the policy applies, wherein the policy model is de-coupled from the policy-scope model so that the policy-model may be re-used within and across domains.

3. The method of claim 2 wherein at least one of the policy model and policy scope model are defined using Managed Object Definition Language (MODEL).

4. The method of claim 2 wherein the policy model defines a first relationship which associates the policy with a type of managed element and wherein the policy scope model identifies a group of the type of managed element for application of the policy.

5. The method of claim 1 wherein the method for managing policy compliance enables managing policies including infrastructure policies, information policies, Information Lifecycle Management (ILM) policies and security policies.

6. The method of claim 1 wherein the method for managing policy compliance enables managing policies including governance policies, regulatory policies and industry policies.

7. The method of claim 1 wherein the policy-aware objects comprise managed element objects associated with policy objects.

8. The method of claim 1 wherein the method further includes the step of propagating one or more events, attributes, symptoms or properties between policy-aware objects associated with the managed element objects, and at least one of the objects detecting a policy violation of its associated policy in response to the propagated information.

9. The method of claim 1, wherein the step of managing policies across the infrastructure at a plurality of stages of policy and infrastructure maturity performs at least one of the steps of:
administering the policies;
identifying and resolving conflicts between the policies;
discovering elements in the infrastructure to which policies should be applied;
monitoring compliance to the policies;
applying the policies to the infrastructure;
auditing policy violations;
performing risk and impact analysis; and
performing policy aware provisioning.

10. A system for managing policy compliance across an infrastructure includes:
a policy-aware configuration management database comprising a topology of policy-aware objects, wherein the policy aware objects are associated with models of managed elements, wherein the managed elements are IT components, the topology defining structural and behavioral relationships of the objects, wherein the topology spans multiple domains indicating the relationships between managed elements and wherein information is exchanged between the policy aware objects in different domains by propagation through the topology by leveraging the defined structural and behavioral relationships; wherein the configuration management database enables policy management in a infrastructure domain, a security domain, and an information domain; wherein at least one policy is applied to the information domain from a group of policies consisting of industry regulation aspects, content management policies and process management policies; wherein at least one policy is applied to the security domain of a group of policies consisting of ensuring that data can only be accessed by authorized managed objects, authentication, authorization and accounting (AAA) policies, and key access policies; wherein at least one policy is applied to the infrastructure domain of the group of policies consisting of performance of services delivered by the information infrastructure such as Quality of Service (QoS) policies, Service Level Agreement (SLA) policies and redundancy requirement policies; and
program modules, stored in a tangible computer readable medium of the system and operable when executed by a processor for managing policies across the infrastructure at a plurality of stages of policy and infrastructure maturity using the topology of policy-aware objects, wherein the plurality of stages of policy and infrastructure maturity are associated with changes in state of at least one of the infrastructure, policies of the infrastructure and compliance of the infrastructure.

11. The system of claim 10 wherein a policy-aware object is instantiated from a policy model which define at least one of the constraints, risks and actions of a policy, and a policy-scope model which identifies at least one managed element to which the policy applies, and wherein the policy model is de-coupled from the policy-scope model so that the policy-model may be re-used within and across domains.

12. The system of claim 10 wherein at least one of the policy model and policy scope model are defined using Managed Object Definition Language (MODEL).

13. The system of claim 12 wherein the policy model defines a first relationship which associates the policy with a type of managed element and wherein the policy scope model identifies a group of the type of managed element for application of the policy.

14. The system of claim 10 for managing policy compliance enables management of policies including infrastructure policies, information policies, Information Lifecycle Management (ILM) policies and security policies.

15. The system of claim 10 for managing policy compliance enable management of policies including governance policies, regulatory policies and industry policies.

16. The system of claim 10 wherein the policy-aware objects comprise managed element objects associated with policy objects.

17. The system of claim 10 wherein the program modules include program code for propagating one or more events, attributes, symptoms or properties between policy-aware objects associated with the managed element objects, and detecting, for at least one of the object, a policy violation of its associated policy in response to the propagated information.

18. The system of claim 10, wherein the program modules that manage policies across the infrastructure at a plurality of stages of policy and infrastructure maturity include program code for:
administering the policies;
identifying and resolving conflicts between the policies;
discovering elements in the infrastructure to which policies should be applied;
monitoring compliance to the policies;
applying the policies to the infrastructure;
auditing policy violations;
performing risk and impact analysis; and
performing policy aware provisioning.

* * * * *